(12) United States Patent
Tan et al.

(10) Patent No.: US 10,502,989 B2
(45) Date of Patent: Dec. 10, 2019

(54) DISPLAY PANEL AND DISPLAY DEVICE

(71) Applicant: BOE TECHNOLOGY GROUP CO., LTD., Beijing (CN)

(72) Inventors: Jifeng Tan, Beijing (CN); Wei Wang, Beijing (CN); Yafeng Yang, Beijing (CN); Xiaochuan Chen, Beijing (CN); Jian Gao, Beijing (CN); Can Wang, Beijing (CN); Can Zhang, Beijing (CN); Xinli Ma, Beijing (CN); Xiandong Meng, Beijing (CN); Xianqin Meng, Beijing (CN); Dacheng Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/737,007

(22) PCT Filed: Jul. 31, 2017

(86) PCT No.: PCT/CN2017/095231
§ 371 (c)(1),
(2) Date: Dec. 15, 2017

(87) PCT Pub. No.: WO2018/076859
PCT Pub. Date: May 3, 2018

(65) Prior Publication Data
US 2018/0364505 A1    Dec. 20, 2018

(30) Foreign Application Priority Data
Oct. 28, 2016   (CN) .......................... 2016 1 0967036

(51) Int. Cl.
*G02F 1/13*   (2006.01)
*G02F 1/1335*   (2006.01)
(Continued)

(52) U.S. Cl.
CPC .......... *G02F 1/1326* (2013.01); *G02F 1/1334* (2013.01); *G02F 1/1343* (2013.01);
(Continued)

(58) Field of Classification Search
CPC ............. G02F 1/1326; G02F 1/133553; G02F 1/13363; G02F 1/1343; G02F 1/1334;
(Continued)

(56) References Cited

U.S. PATENT DOCUMENTS 5,299,289 A * 3/1994 Omae ............... G02F 1/133371
348/E9.027
6,215,928 B1 * 4/2001 Friesem .................. G02F 1/025
372/102
(Continued)

FOREIGN PATENT DOCUMENTS

CN   1886691 A    12/2006
CN   101661181 A   3/2010
(Continued)

OTHER PUBLICATIONS

First Office Action dated Feb. 9, 2018 corresponding to Chinese application No. 201610967036.6.
(Continued)

*Primary Examiner* — Charles S Chang
(74) *Attorney, Agent, or Firm* — Nath, Goldberg & Meyer; Joshua B. Goldberg; Stanley Protigal

(57) ABSTRACT

A display panel and a display device are disclosed and belong to the field of display technology. The display panel comprises a first substrate and a second substrate opposite to each other, and a liquid crystal layer, a first electrode, as second electrode, a waveguide layer and a grating layer between the first and second substrates; wherein the waveguide layer is on a side of the liquid crystal layer proximal to the first substrate; and the grating layer is in contact with
(Continued)

the liquid crystal layer; the first electrode and the second electrode are configured to adjust a refractive index of the liquid crystal layer by changing voltages applied thereto; and a coupling efficiency at which light is coupled out of the waveguide layer is determined according to a difference between a refractive index of the grating layer and the refractive index of the liquid crystal layer.

17 Claims, 3 Drawing Sheets

(51) Int. Cl.
  *G02F 1/13363*   (2006.01)
  *G02F 1/1343*    (2006.01)
  *G02F 1/1334*    (2006.01)
(52) U.S. Cl.
  CPC .... *G02F 1/13363* (2013.01); *G02F 1/133504* (2013.01); *G02F 1/133553* (2013.01); *G02F 1/133615* (2013.01); *G02F 2001/133567* (2013.01); *G02F 2201/30* (2013.01); *G02F 2201/307* (2013.01)
(58) Field of Classification Search
  CPC ........ G02F 1/133504; G02F 1/133615; G02F 2001/133567; G02F 2201/307; G02F 2201/30

USPC .......................................................... 349/88
See application file for complete search history.

(56) References Cited

U.S. PATENT DOCUMENTS

| | | | |
|---|---|---|---|
| 2005/0237475 A1* | 10/2005 | Chou | ................ G02F 1/133553 349/198 |
| 2006/0227283 A1 | 10/2006 | Ooi et al. | |
| 2017/0033287 A1* | 2/2017 | Chida | ................... H01L 51/003 |

FOREIGN PATENT DOCUMENTS

| | | |
|---|---|---|
| CN | 101666940 A | 3/2010 |
| CN | 201556006 U | 8/2010 |
| CN | 106292049 A | 1/2017 |
| CN | 106292124 A | 1/2017 |
| CN | 106444177 A | 2/2017 |
| CN | 206757263 U | 12/2017 |

OTHER PUBLICATIONS

International Search Report dated Sep. 26, 2017 in corresponding International Application No. PCT/CN2017/095231 along with an English translation of the International Search Report and an English translation of the Written Opinion of the International Searching Authority.

* cited by examiner

DISPLAY PANEL AND DISPLAY DEVICE

This is a National Phase Application filed under 35 U.S.C. 371 as a national stage of PCT/CN2017/095231, filed Jul. 31, 2017, an application claiming the benefit of Chinese Application No. 201610967036.6, filed Oct. 28, 2016, the content of each of which is hereby incorporated by reference in its entirety.

TECHNICAL FIELD

The present disclosure relates to the field of display technology, and particularly relates to a display panel and a display device.

BACKGROUND

In the field of display technology, a liquid crystal display device includes a backlight and a display panel. The display panel includes an array substrate and a color filter substrate provided opposite to each other, a liquid crystal layer is provided between the array substrate and the color filter substrate, and the array substrate and the color filter substrate each are provided with a polarizer on the back. Grayscale display is achieved through deflection of liquid crystals controlled by a voltage and control of the two polarizers.

SUMMARY

The inventor found out that the use of a polarizer in a display panel of a liquid crystal display device in the prior art may result in a low transmittance of the liquid crystal display device (for example, a transmittance of about 7%) and a large liquid crystal cell thickness (for example, 3 µm to 5 µm), but a large cell thickness may reduce liquid crystal response speed, and furthermore, color resistors are generally provided on the color filter substrate to realize color display, which also cause the display panel to be thick.

The present disclosure provides a display panel including a first substrate and a second substrate opposite to each other, and a liquid crystal layer, a first electrode, as second electrode, a waveguide layer and a grating layer that are between the first substrate and the second substrate; wherein, the waveguide layer is on a side of the liquid crystal layer proximal to the first substrate; the grating layer is in contact with the liquid crystal layer;

the first electrode and the second electrode are configured to adjust a refractive index of the liquid crystal layer by changing voltages applied thereto; and a coupling efficiency at which light is coupled out of the waveguide layer is determined according to a difference between a refractive index of the grating layer and the refractive index of the liquid crystal layer. In an embodiment, the grating layer is on a side of the liquid crystal layer proximal to the first substrate.

In an embodiment, the grating layer is on a side of the liquid crystal layer proximal to the second substrate.

In an embodiment, the first electrode and the second electrode are on one side of the liquid crystal layer.

In an embodiment, the first electrode and the second electrode are on different sides of the liquid crystal layer.

In an embodiment, the first electrode is on a side of the waveguide layer away from the first substrate; the grating layer is on a side of the waveguide layer away from the first electrode; the liquid crystal layer is on a side of the grating layer away from the waveguide layer; and the second electrode is on a side of the second substrate proximal to the liquid crystal layer.

In an embodiment, a refractive index of the waveguide layer is larger than a refractive index of the first electrode, and the refractive index of the first electrode is larger than or equal to the refractive index of the grating layer.

In an embodiment, the refractive index of the grating layer ranges from an ordinary refractive index $n_o$ of the liquid crystal layer to an extraordinary refractive index $n_e$ of the liquid crystal layer.

In an embodiment, the grating layer includes grating structures arranged at intervals, the liquid crystal layer covers the grating layer and fills in a gap between the grating structures, and a thickness of the liquid crystal layer is larger than a thickness of the grating layer.

In an embodiment, the display panel includes a plurality of pixel units, and a period of the grating structure in each of the pixel units corresponds to an emergent angle of light having a specific wavelength.

In an embodiment, a material of the liquid crystal layer includes a polymer dispersed liquid crystal or a polymer network liquid crystal.

The present disclosure further provides a display device, including the above display panel and a backlight.

In an embodiment, the backlight is an edge type backlight for providing collimated light.

In an embodiment, the display device further includes a light-shielding layer on a side of the display panel away from the backlight.

DETAILED DESCRIPTION

To enable those skilled in the art to better understand technical solutions of the present disclosure, the present disclosure will be described in detail below in conjunction with the accompanying drawings and specific embodiments.

First Embodiment

Figure 1:
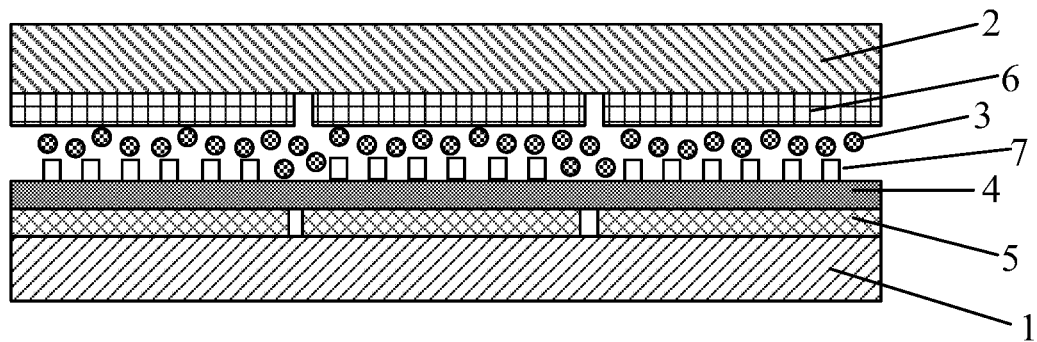
FIG. 1 is a schematic structural diagram of a display panel in a first embodiment of the present disclosure.
Figure 2:
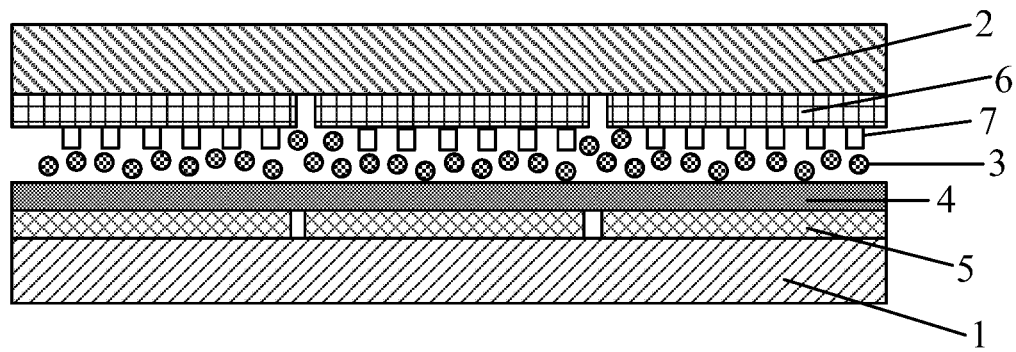
FIG. 2 is a schematic structural diagram of a display panel in the first embodiment of the present disclosure.

Referring to FIGS. 1 and 2, this embodiment provides a display panel including a first substrate 1 and a second substrate 2 that are provided opposite to each other, and a liquid crystal layer 3, a first electrode 5, a second electrode 6, a waveguide layer 4, and a grating layer 7 that are provided between the first substrate 1 and the second substrate 2. The waveguide layer 4 is located on a side of the liquid crystal layer 3 proximal to the first substrate. The grating layer 7 is in contact with the liquid crystal layer 3. The first electrode 5 and the second electrode 6 are configured to adjust a refractive index of the liquid crystal layer 3. The grating layer 7 is configured to control light to be coupled out from the waveguide layer 4 and control light having a specific wavelength of light coupled out of the waveguide layer 4 to be emitted out in a specific direction, and a coupling efficiency at which the waveguide layer 4 couples out light is determined according to a difference between a refractive index of the grating layer 7 and a refractive index of the liquid crystal layer 3.

In this embodiment, the refractive index of the liquid crystal layer 3 may be adjusted according to a difference between voltages applied to the first electrode 5 and the second electrode 6, and the coupling efficiency at which the waveguide layer 4 couples out light is determined according to the difference between the refractive indexes of the liquid crystal layer 3 and the grating layer 7, therefore, when the difference between the voltages applied to the first electrode 5 and the second electrode 6 is changed, a deflection angle of liquid crystals in the liquid crystal layer 3 is changed, and the liquid crystal layer 3 thus has a changed effective refractive index with respect to incident light, resulting in a change in the difference between the refractive indexes of the liquid crystal layer 3 and the grating layer 7, which in turn results in a change in the coupling efficiency at which the waveguide layer 4 couples out light, that is, a display grayscale of the display panel changes. At the same time, the grating layer 7 may also realize coupling of the waveguide layer 4 in a specific mode, a specific grating period may be set such that light of a certain wavelength (color) is emitted out at a desired angle. As such, compared with an existing display panel, the display panel of the present embedment can achieve control of light exiting direction without a polarizer, and can also achieve color display without a color filter.

As shown in FIG. 1, the grating layer 7 in the present embodiment may be provided on a side of the liquid crystal layer 3 proximal to the first substrate 1, that is, the grating layer 7 is closer to the waveguide layer 4 than the liquid crystal layer 3, and in this case, the grating layer 7 can control the coupling efficiency at which light is coupled out from the waveguide layer 4. As shown in FIG. 2, the grating layer 7 may be provided on a side of the liquid crystal layer 3 proximal to the second substrate 2, that is, the liquid crystal layer 3 is closer to the waveguide layer 4 than the grating layer 7.

Figure 3:
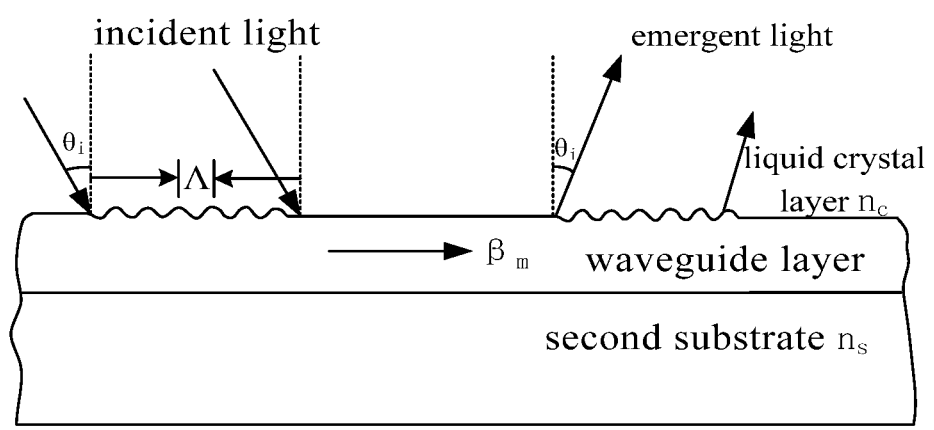
FIG. 3 is a schematic structural diagram illustrating a liquid crystal layer, a gating unit and a waveguide layer in a display panel of a display panel forming a variable grating coupler according to the first embodiment of the present disclosure.

Specifically, no matter which one of the above-mentioned arrangements is adopted, as shown in FIG. 3, the liquid crystal layer 3, the grating layer 7 and the waveguide layer 4 can form a variable grating coupler, which can effectively couple light into or out of the waveguide layer 4. When incident light or emergent light satisfies a phase matching relation $\beta q = \beta m - qK$ ($q=0, \pm 1, \pm 2, \ldots$), the incident light can excite m-th order guided mode or the m-th order guided mode can be coupled out in a given direction, where $\beta q$ is the propagation constant of the incident light, $\beta m$ is the propagation constant of the m-th order guided mode, q is the diffraction order, and K is a grating vector. Since $\beta m = k_0 Nm$ and $K = 2\pi/\Lambda$, the above phase matching relation can be further expressed as $k_0 n_c \sin \theta_i = k_0 Nm - q 2\pi/\Lambda$ ($q=0, \pm 1, \pm 2, \ldots$), where $k_0$ is $2\pi/\lambda$, $n_c$ is the refractive index of the liquid crystal layer 3, $\theta_i$ is an angle between a wave-vector direction of the incident light and a vertical direction, or an angle between a wave-vector direction of the emergent light and the vertical direction, Nm is an effective refractive index of the m-th order guided mode, and $\Lambda$ is the period of the grating layer 7. It can be seen from the above phase matching relation that the grating layer 7 can control coupling efficiency at which light is coupled out of the waveguide layer 4 by changing the refractive index $n_c$ of the liquid crystal layer 3, and the coupling efficiency is related to the difference between the refractive indexes of the liquid crystal layer 3 and the grating layer 7. By controlling the difference between the voltages applied to the first electrode 5 and the second electrode 6, the refractive index of the liquid crystal layer 3 in the corresponding pixel unit can be controlled, so as to obtain a desired display gray scale.

In addition, it is set that the effective refractive index of the m-th order guided mode propagating in the waveguide layer is Nm, and light of a specific color has a wavelength of $\lambda$, and in this case, the phase matching relation can also be expressed as follows:

$$2\pi/\lambda \cdot Nm = 2\pi/\lambda \cdot n_c \sin \theta + q 2\pi/\Lambda (q=0, \pm 1, \pm 2, \ldots)$$

Where $\theta$ is an angle between a light exiting direction and a normal line of a plane of the panel, $n_c$ is the refractive index of the liquid crystal layer 3, and $\Lambda$ is the grating period. It can be seen from the above formula that light of a specific color (wavelength) can be controlled to be emitted out from the display panel at a desired angle by setting an appropriate grating period.

In a preferred embodiment, the display panel of the present disclosure is applicable to display application with a fixed angle of view such as virtual reality, enhanced display and the like, wherein relative position between the display panel and a user's eye is fixed. In this embodiment, a pixel at a specific position on the display panel has a fixed light exiting direction (i.e., the above-mentioned angle $\theta$). By setting an appropriate grating period in each pixel, emergent light of a specific color (wavelength $\lambda$) can be provided in the fixed direction.

The first electrode 5 and the second electrode 6 in this embodiment are located on one side or on different sides of the liquid crystal layer 3. In an embodiment, the first electrode 5 is a pixel electrode and the second electrode 6 is a common electrode.

Specifically, the first electrode 5 and the second electrode 6 are located on different sides of the liquid crystal layer 3. The first electrode 5 is located on a side of the liquid crystal layer 3 proximal to the first substrate 1, and the second electrode 6 is located on a side of the liquid crystal layer 3 proximal to the second substrate 2. In this case, the display panel may be a twisted nematic (TN) type display panel, a vertical alignment (VA) type display panel, or an electronically controlled birefringence (ECB) display device.

Alternatively, the first electrode 5 and the second electrode 6 are located on one side of the liquid crystal layer 3. Both the first electrode 5 and the second electrode 6 are located at one side of the liquid crystal layer 3 proximal to the first substrate 1. In a case where the first electrode 5 and the second electrode 6 are located in different layers, the display panel may be an Advanced Super Dimension Switch (ADS) display panel. In a case where the first electrode 5 and the second electrode 6 are located in a single layer, the display panel may be an In-Plane Switching (IPS) display panel, which is not illustrated in detail herein. In practical applications, the display panel may also be a display panel of other type, which is not listed one by one herein.

A liquid crystal of the liquid crystal layer 3 may be a polymer dispersed liquid crystal (PDLC) or a polymer network liquid crystal (PNLC).

Specifically, PDLC is a material that can be obtained as follows: a low molecular liquid crystal and a prepolymer are mixed together and form micron-sized liquid crystal droplets by a polymerization reaction under certain conditions, the micron-sized liquid crystal droplets are uniformly dispersed in a high polymer network, and then dielectric anisotropy of the liquid crystal molecules is used to obtain a material having photoelectric response properties. PDLC is a mixture, it is assumed that the refractive index of the polymer is $n_p$, the refractive index of the liquid crystal is $n_o$ or $n_e$, and in the embodiment let $n_p=n_o$, in the absence of an applied voltage, a regular electric field cannot be formed between films, optical axes of the liquid crystal droplets are orientated randomly and disorderedly, the effective refractive index $n_o$ does not match with the refractive index $n_p$ of the polymer, and in this case, the effective refractive index of the PDLC is an intermediate value between $n_o$ and $n_e$, and the intermediate value is $n_c$. In the presence of an applied voltage, the optical axes of the liquid crystal droplets are aligned perpendicular to a surface of the film, that is, in the same direction as the electric field. The ordinary refractive index of the droplets substantially matches with the refractive index of the polymer, thus, there is no obvious interface, a substantially uniform medium is formed, and in this case, the overall refractive index of the PDLC material is $n_o$. In the meanwhile, PDLC does not need an alignment layer, initial orientation of the liquid crystal is disordered, which can avoid influence of the grating height on orientations of the liquid crystal molecules in other liquid crystal modes. The principle of PNLC is the same as that of PDLC and will not be described in detail herein.

A material of the grating layer 7 is a transparent dielectric material, such as $SiO_2$ or other organic resin. The refractive index of the grating layer 7 is in the range of the ordinary refractive index $n_o$ of the liquid crystal layer 3 to the extraordinary refractive index $n_e$ of the liquid crystal layer 3, and in an embodiment, the refractive index of the grating layer 7 is $n_o$.

Specifically, the grating layer 7 includes grating structures arranged at intervals (the grating structures may be formed in any method, for example, by forming grooves in a transparent dielectric layer, as long as it can be ensured that the grating structures are transparent protrusions), the liquid crystal layer 3 covers the grating layer 7 and filled in a gap between the grating structures, and a thickness of the liquid crystal layer 3 is larger than a thickness of the grating layer 7. Therefore, the thickness of the liquid crystal layer 3 may be set to be very small, that is, a liquid crystal cell may be set to have a very small thickness, so as to further improve response speed of the liquid crystal. The period of the grating layer 7 is determined by the designed direction and color of emergent light, and generally has a duty ratio of 0.5, but a duty ratio in practical product design may deviate from this value (for example, for the purpose of adjusting intensity of the emergent light, balancing difference in brightness of different positions of the display panel, and the like). The grating layer 7 generally has a height of about 500 nm, the height may be slightly larger than 500 nm, for example, is 1 µm, or slightly smaller than 500 nm, for example, is 200 nm, and in practice, coupling between the waveguide layer 4 and the grating layer 7 is not particularly sensitive to the height of the grating layer 7. For pixels of different colors (R, G, B pixels), heights of the respective grating layers may be the same, or be designed respectively. In some embodiments of the present disclosure, the grating layer 7 is immediately adjacent to the waveguide layer 4.

Figure 4:
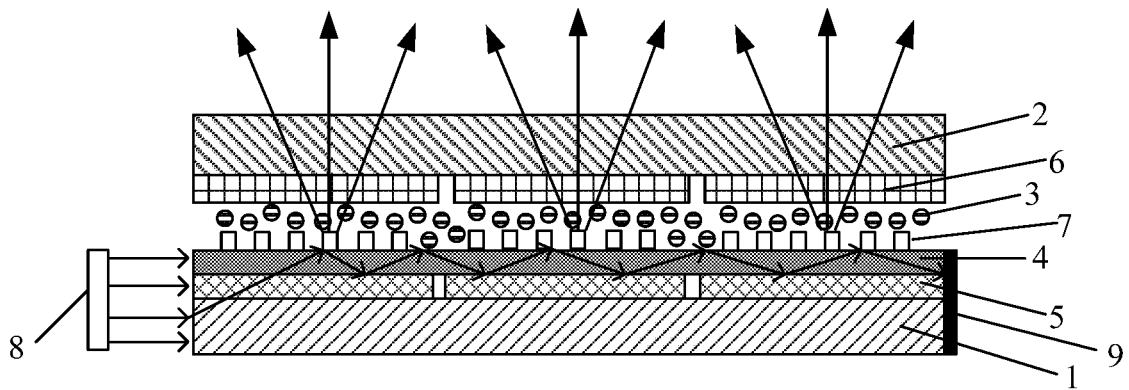
FIG. 4 is a schematic structural diagram of a display device according to the first and second embodiments of the present disclosure.

As shown in FIG. 4, as a specific implementation of the embodiment, the first electrode 5 in the display panel is located on a side of the waveguide layer 4 away from the first substrate 1; the grating layer 7 is located on a side of the waveguide layer 4 away from the first electrode 5; the liquid crystal layer 3 is located on a side of the grating layer 7 away from the waveguide layer 4; and the second electrode 6 is located on a side of the second substrate 2 proximal to the liquid crystal layer 3.

Figure 5:
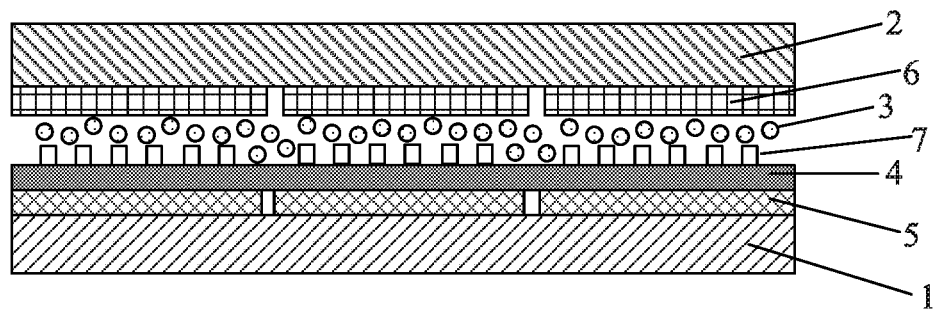
FIG. 5 is a schematic diagram of a display panel in L0 mode according to the first embodiment of the present disclosure.
Figure 6:
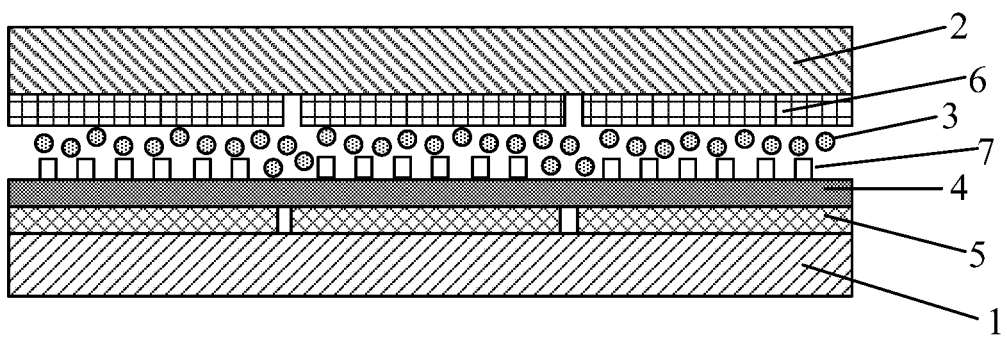
FIG. 6 is a schematic diagram of a display panel in L255 mode according to the first embodiment of the present disclosure.

Specifically, by adjusting the voltages applied to the first electrode 5 and the second electrode 6, rotation of a refractive index ellipsoid of the liquid crystal layer 3 in a cross section (principal plane) as shown in FIG. 5 can be realized, thereby realizing adjustment of the refractive index of the liquid crystal layer 3 between $n_o$ and $n_e$. When the refractive index of the liquid crystal layer 3 and the refractive index of the grating layer 7 are equal, the function of the grating layer 7 is masked, no light is coupled out of the waveguide layer 4, and in this case, normally black mode (L0 mode) appears. As shown in FIG. 6, when the difference between the refractive indexes of the liquid crystal layer 3 and the grating layer 7 is the largest, the grating layer 7 has the most obvious effect, the coupling efficiency at which light is coupled out from the waveguide layer 4 is the highest, and in this case, normally white mode (L255 mode) appears. When the refractive index of the liquid crystal layer 3 is between the values in the above two cases, other grayscale state appears. Since only polarized light (e light) whose vibration direction is in the cross section (principal plane) shown in FIG. 4 can sense the change in the refractive index, whereas polarized light (o light) whose vibration direction is perpendicular to the principal plane cannot sense the change in the refractive index, the light coupled out of the variable grating is the polarized light (e light). For a typical liquid crystal material, an alignment film (in general, PI) needs to be provided on a lower surface (e.g., the lower surface, but not limited to the lower surface) of the second electrode 6 to control initial alignment of liquid crystal molecules and ensure that the liquid crystal molecules can rotate as expected under an applied voltage to determine whether it is normally black display mode or normally white display mode.

Figure 7:
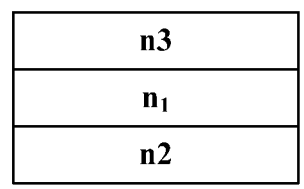
FIG. 7 is a schematic diagram of a planar waveguide of a display panel according to the first embodiment of the present disclosure.

Those skilled in the art could know that, as shown in FIG. 7, a planar waveguide is formed by three material layers, the middle layer is a waveguide film having a refractive index of $n_1$ and deposited on a substrate having a refractive index of $n_2$, and a covering layer having a refractive index of $n_3$ is on the waveguide film. The waveguide film is typically has a micron-sized height, which is comparable to the wavelength of light. A difference between refractive indexes of the waveguide film and the substrate is generally between $10^{-1}$ and $10^{-3}$. In order to form a true optical waveguide, $n_1$ must be greater than $n_2$ and $n_3$, that is, $n_1 > n_2 >= n_3$. In this way, light can be limited in the waveguide film and propagate in the waveguide film.

Therefore, in this embodiment, the refractive index of the waveguide layer 4 is greater than the refractive index of the first electrode 5, and the refractive index of the first electrode 5 is greater than or equal to the refractive index of the grating layer 7, so as to realize a planar waveguide.

Figure 8:
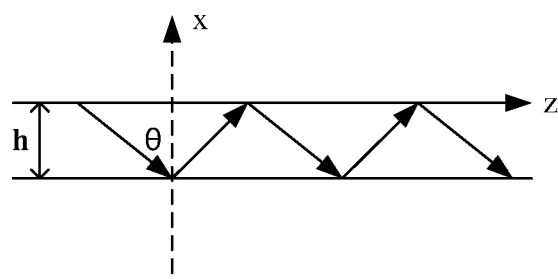
FIG. 8 is a schematic diagram of propagation in a planar waveguide according to the first embodiment of the present disclosure.

As shown in FIG. 8, propagation of light in a planar waveguide can be considered as that light is totally reflected at the interface of the first electrode 5 and the waveguide layer 4, propagates along a zigzag path in the waveguide film. Light propagates in a zigzag pattern in the Z direction in the waveguide, the light is restrained in the x direction and not strained in the y direction.

In the planar waveguide, $n_1 > n_2$ and $n_1 > n_3$, when an incident angle $\theta_1$ of incident light exceeds the critical angle $\theta_0$:

$$\sin\theta_0 = \frac{n_2}{n_1};$$

The incident light is totally reflected, and this time, certain phase jump is produced at a reflection point. From Fresnel reflection formula:

$$R_{TE} = \frac{n_1\cos\theta_1 - \sqrt{n_2^2 - n_1^2\sin^2\theta_1}}{n_1\cos\theta_1 + \sqrt{n_2^2 - n_1^2\sin^2\theta_1}};$$

$$R_{TM} = \frac{n_2^2\cos\theta_1 - n_1\sqrt{n_2^2 - n_1^2\sin^2\theta_1}}{n_2^2\cos\theta_1 + n_1\sqrt{n_2^2 - n_1^2\sin^2\theta_1}},$$

we can derive the phase jump $\varphi_{TM}$, $\varphi_{TE}$ at the reflection points are:

$$\tan\phi_{TE} = \frac{\sqrt{\beta^2 - k_0^2 n_2^2}}{\sqrt{k_0^2 n_1^2 - \beta^2}};$$

$$\tan\phi_{TM} = \frac{n_1^2\sqrt{\beta^2 - k_0^2 n_2^2}}{n_2^2\sqrt{k_0^2 n_1^2 - \beta^2}};$$

where $\beta = k_0 n_1 \sin\theta_1$, $\beta$ is a propagation constant of light, $k_0 = 2\pi/\lambda$, $k_0$ is a wave number of light in vacuum, and $\lambda$ is the wavelength of light.

In order that light propagates stably in a waveguide, the following equation needs to be satisfied:

$$2kh - 2\phi_{12} - 2\phi_{13} = 2m\pi, m = 0,1,2,3\ldots;$$

where: $k = k_0 n_1 \cos\theta$, $\varphi_{12}$ and $\varphi_{13}$ are phase differences of total reflection, h is a thickness of the waveguide, m is a modulus, that is, a positive integer from zero. Therefore, any light having an incident angle satisfying the above equation can stably propagates in the optical waveguide.

Second Embodiment

The present embodiment provides a display device, which includes a backlight 8 and a display panel in the first embodiment.

In this embodiment, the backlight 8 is an edge type backlight 8 for providing collimated (parallel) light. In practical applications, a backlight 8 in other form may also be used. For example, the backlight 8 may be a direct type backlight 8, which is not specifically illustrated.

The backlight 8 may include an LED light source or a light source in other mode. A LED chip may include a blue LED or other LED with a shorter wavelength than blue light, and a light source in other mode may be a laser light source. Optionally, in a case where the backlight 8 is a laser light source, a beam expanding structure may be further provided on a light exiting side of the backlight 8 (i.e., between the backlight 8 and the display panel), and the expanding structure can not only expand laser light, as a laser point light source, emitted by the laser light source to a collimated light source, but also increase a diameter of light beam.

The backlight 8 is provided at least correspondingly to the waveguide layer 4, and a light exiting direction of light from the backlight 8 is parallel to a plane where the waveguide layer 4 is located. As shown in FIG. 4, the backlight 8 is provided correspondingly to the first substrate 1, the waveguide layer 4 and the first electrode 5, and a width of the backlight 8 may be the sum of widths of the first substrate 1, the waveguide layer 4 and the first electrode 5. In practical applications, the backlight 8 may be set to have other width, but it is preferable that the backlight 8 does not emit light to the liquid crystal layer 3 and layers above the liquid crystal layer. Since a sealant is provided on outer side of the liquid crystal layer 3, light emitted towards the liquid crystal layer 3 will not enter into the liquid crystal layer 3. Needless to say, the arrangement of the backlight 8 is not limited to the above arrangements, and the backlight 8 can be arranged in any manner as long as it can be ensured that light (incident light) emitted by the backlight 8 is totally reflected in the waveguide layer 4.

In an embodiment, light emitted from the backlight 8 is collimated light. In particular, when the backlight 8 is a laser light source, light emitted from the backlight 8 becomes collimated light due to the expanding structure.

In an embodiment, the display device further includes a light-shielding layer 9 on a side of the display panel away from the backlight 8, and the light-shielding layer 9 is configured to absorb light remaining in the waveguide layer 4 after the light emitted from the backlight 8 is coupled out of the waveguide layer 4 by the grating layer 7, so as to prevent light leak of the display device.

In this embodiment, the display device may be an ECB display device, a TN display device, a VA display device, an IPS display device, or an ADS display device.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

The invention claimed is:

1. A display panel, comprising a first substrate and a second substrate opposite to each other, and a liquid crystal layer, a first electrode, as second electrode, a waveguide layer and a grating layer that are between the first substrate and the second substrate; wherein, the waveguide layer is on a side of the liquid crystal layer proximal to the first substrate; and the grating layer is in contact with the liquid crystal layer;

the first electrode and the second electrode are configured to adjust a refractive index of the liquid crystal layer by changing voltages applied thereto; and a coupling efficiency at which light is coupled out of the waveguide layer is determined according to a difference between a refractive index of the grating layer and the refractive index of the liquid crystal layer, wherein the first electrode is on a side of the waveguide layer proximal to the first substrate; the grating layer is on the side of the waveguide layer away from the first electrode; the liquid crystal layer is on a side of the grating layer away from the waveguide layer; and the second electrode is on a side of the second substrate proximal to the liquid crystal layer, and a refractive index of the waveguide layer is larger than a refractive index of the first electrode, and the refractive index of the first electrode is larger than or equal to the refractive index of the grating layer.

2. The display panel of claim 1, wherein the grating layer is on a side of the liquid crystal layer proximal to the first substrate.

3. The display panel of claim 1, wherein the first electrode and the second electrode are on one side of the liquid crystal layer.

4. The display panel of claim 1, wherein the first electrode and the second electrode are on different sides of the liquid crystal layer.

5. The display panel of claim 1, wherein the refractive index of the grating layer ranges from an ordinary refractive index $n_o$ of the liquid crystal layer to an extraordinary refractive index $n_e$ of the liquid crystal layer.

6. The display panel of claim 5, wherein a material of the liquid crystal layer comprises a polymer dispersed liquid crystal.

7. The display panel of claim 5, wherein a material of the liquid crystal layer comprises a polymer network liquid crystal.

8. The display panel of claim 1, wherein the grating layer comprises grating structures arranged at intervals, the liquid crystal layer covers the grating layer and fills in a gap between the grating structures, and a thickness of the liquid crystal layer is larger than a thickness of the grating layer.

9. The display panel of claim 8, wherein the display panel comprises a plurality of pixel units, and a period of the grating structure in each of the pixel units corresponds to an emergent angle of light of a specific wavelength.

10. The display panel of claim 8, wherein a material of the liquid crystal layer comprises a polymer dispersed liquid crystal.

11. The display panel of claim 8, wherein a material of the liquid crystal layer comprises a polymer network liquid crystal.

12. The display panel of claim 9, wherein a material of the liquid crystal layer comprises a polymer dispersed liquid crystal.

13. The display panel of claim 1, wherein a material of the liquid crystal layer comprises a polymer dispersed liquid crystal.

14. A display device, comprising a backlight and the display panel according to claim 1.

15. The display device of clam 14, wherein the backlight is an edge type backlight configured to provide collimated light.

16. The display device of clam 15, further comprising a light-shielding layer on a side of the display panel away from the backlight.

17. The display panel of claim 1, wherein a material of the liquid crystal layer comprises a polymer network liquid crystal.

* * * * *